(12) United States Patent
Randall

(10) Patent No.: US 7,730,992 B1
(45) Date of Patent: Jun. 8, 2010

(54) OFF ROAD HEAVY DUTY TRANSMISSION/TRANSFER CASE MOUNT

(76) Inventor: Randy Randall, 4654 West Lea SW., Albuquerque, NM (US) 97105

( * ) Notice: Subject to any disclaimer, the term of this patent is extended or adjusted under 35 U.S.C. 154(b) by 112 days.

(21) Appl. No.: 12/155,028

(22) Filed: May 29, 2008

(51) Int. Cl.
*B60K 17/00* (2006.01)

(52) U.S. Cl. .................... 180/377; 180/378; 180/312

(58) Field of Classification Search ............. 180/377, 180/312, 291, 375, 374, 378, 382, 299, 300, 180/232, 124.111, 124.156, 124.109
See application file for complete search history.

(56) References Cited

U.S. PATENT DOCUMENTS

| | | | | |
|---|---|---|---|---|
| 305,643 | A * | 9/1884 | Thompson | 280/124.111 |
| 1,602,349 | A * | 10/1926 | Ferguson | 280/124.111 |
| 1,620,323 | A * | 3/1927 | Bugatti | 280/124.111 |
| 3,580,350 | A | 5/1971 | Arkus-Duntov | |
| 3,747,879 | A * | 7/1973 | Houk | 248/609 |
| 4,249,627 | A | 2/1981 | Voll et al. | |
| 4,402,380 | A | 9/1983 | Strong | |
| 4,610,421 | A | 9/1986 | Ohta et al. | |
| 5,129,479 | A * | 7/1992 | Fujii et al. | 180/297 |
| 5,251,865 | A | 10/1993 | Kelly | |
| 6,244,613 | B1 * | 6/2001 | Renger | 280/440 |
| 6,761,242 | B2 * | 7/2004 | Yoshida et al. | 180/298 |
| 6,959,922 | B2 * | 11/2005 | Miyahara | 267/140.3 |
| 7,191,675 | B2 | 3/2007 | Ho | |
| 7,575,088 | B2 * | 8/2009 | Mir et al. | 180/300 |
| 7,588,117 | B2 * | 9/2009 | Fukuda | 180/291 |
| 2006/0144631 | A1 * | 7/2006 | Kim | 180/299 |
| 2007/0051549 | A1 * | 3/2007 | Fukuda | 180/232 |
| 2008/0173783 | A1 * | 7/2008 | Bunker | 248/634 |

* cited by examiner

*Primary Examiner*—Ruth Ilan
*Assistant Examiner*—Jordan Golomb
(74) *Attorney, Agent, or Firm*—Paul R Martin

(57) ABSTRACT

A mounting unit is mounted to the frame cross member of a vehicle. The mounting unit includes a bottom unit which is bolted to the frame cross member and a top unit which is bolted to the transmission/transfer case adapter. The top and bottom units are bolted to one another. The mounting unit allows the motor, transmission, and transfer case to move freely with respect to each other during hard use conditions, including extreme four-wheeling, without damaging the mounting unit.

3 Claims, 1 Drawing Sheet

OFF ROAD HEAVY DUTY TRANSMISSION/TRANSFER CASE MOUNT

TECHNICAL FIELD OF THE INVENTION

Figure 1:
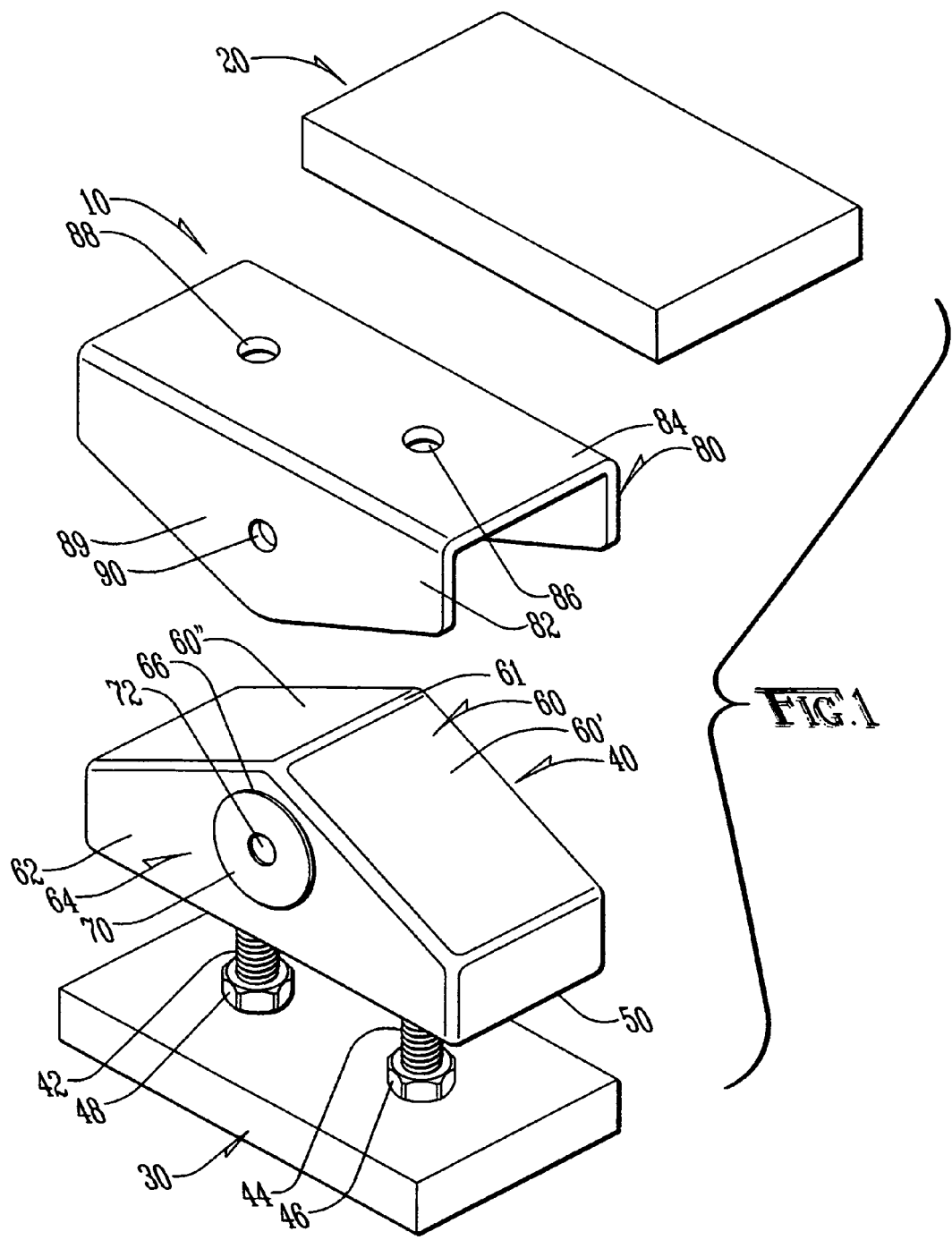

This invention is related to the general field of mounts for automotive applications. In particular, the invention relates to a mount for a transmission/transfer case.

BACKGROUND OF THE INVENTION

Automotive transmissions are normally installed in trucks and automobiles by mounting them on a cross-arm attached to the frame of the vehicle. A transmission mount, normally consisting of two horizontal metal plates attached to a rubber-filled core, is inserted between the bottom of the transmission housing and the top of the cross-arm to provide support and shock-absorption for the transmission. In most vehicles the top plate of the mount is secured to the bottom of the transmission's housing by means of two perforations precisely spaced apart and sized to receive corresponding studs or bolts protruding down from the transmission. Similarly, the bottom plate of the mount features one, two or three studs or threaded holes designed to match corresponding apertures or bolts, respectively, in the top of the cross-arm.

Thus, the mount is first fastened to the top of the cross-arm by securing its bottom plate to it; the transmission is then installed on top of the mount and secured to its top plate, as well as to other parts of the vehicle and of the drive-train. Once so assembled, the transmission is firmly braced to and supported by the cross-arm through the rubber mount so installed, which also provides shock absorption to alleviate the effects of vibrations during the operation of the vehicle.

This kind of mount has been used for decades by the automotive industry and its effectiveness and reliability are proven. Unfortunately, because at various different times the engine is prone to various different vibrations of various different frequencies and amplitudes, prior art mounting systems have not always been found satisfactory.

The mount must connect the unit to the engine in a manner which permits flexion yet is stable enough to prevent the unit from separating from the engine during rough driving, such as would be encountered in an off-road situation.

Specifically, the engine-transmission assembly in a vehicle is liable to undergo five main different types of vibration, hereinafter termed idling vibration, stumbling, engine shaking, engine wind up vibration, and booming.

The idling vibration of an engine-transmission assembly is a phenomenon that the engine-transmission assembly rolls vibrationally about the one axis of its principal axes of inertia which typically is nearly parallel to and nearly coincident with the rotational axis of the power output member of the engine-transmission assembly, during idling operation of the engine (which is one of the minor axes of inertia), and this occurs when the resonant frequency of rotation of the engine-transmission assembly around this principal axis of inertia coincides with or is an exact multiple or submultiple of the rotational speed of the engine. This idling vibration is a particular problem in a vehicle in which the engine-transmission assembly is transversely mounted, because the vibration is particularly effectively transmitted to the vehicle body in such a case. In order to suppress this idling vibration of the engine-transmission assembly, the spring constant and the damping coefficient of the engine supports that are particularly concerned with this vibration are both required to be low, so as to lower the resonant frequency of rotation of the engine-transmission assembly around this principal axis of inertia, and so as not to present a high apparent spring constant as explained below. The amplitude of this idling vibration tends to be quite low, while the frequency is medium to quite high.

Stumbling is a phenomenon wherein the vehicle is vibrationally jerked in the fore and aft directions during rapid acceleration or deceleration of the vehicle, and this is due to twisting or rolling vibration of the engine-transmission assembly caused by rapid changes of torque supported by the engine-transmission assembly housing relative to the output shaft of the engine. In order to suppress this stumbling, the spring constant and the damping coefficient of the relevant parts of the engine-transmission assembly mounting system are both required to be high. The amplitude of this stumbling tends to be quite high, while the frequency is quite low.

Engine wind up vibration is a phenomenon wherein the engine-transmission assembly vibrates up and down relative to the vehicle body by being coupled to the rolling vibration of the engine-transmission assembly, when the vehicle is suddenly accelerated or decelerated; and this occurs when the natural frequency of the relevant parts of the engine-transmission assembly mounting system in the vertical direction resonates with the frequency of such rolling vibration of the engine-transmission assembly. In order to suppress this engine wind-up vibration, it is required to uncouple the vertical vibration of the engine-transmission assembly from the rolling vibration thereof.

Engine shaking is a phenomenon wherein the engine-transmission assembly vibrates up and down relative to the vehicle body during operation of the vehicle upon an irregular road surface, due to the bumping of the vehicle body up and down upon the irregular road surface, said bumping of the vehicle body being transmitted to the engine-transmission assembly by way of the mounting system therefor, and this occurs when the natural frequency of the relevant parts of the engine-transmission assembly mounting system in the vertical direction resonates with the up and down vibrational bouncing movement of the vehicle body. In order to suppress this engine shaking, the spring constant and the damping coefficient of the relevant parts of the engine-transmission assembly mounting system are both required to be high. The amplitude of this engine shaking tends to be quite high, while the frequency is quite low.

Finally, the booming is a phenomenon wherein a booming noise is generated, typically during high speed relatively steady operation of the vehicle, in the passenger compartment of the vehicle due to vibrations of relatively high frequency of the engine-transmission assembly and the drive train of the vehicle which are consonant with the natural frequency of the vehicle body, particularly the compartment structure of the vehicle, thus causing a booming noise in the passenger compartment. In order to suppress this booming noise, the spring constant and the damping coefficient of the relevant parts of the engine-transmission assembly mounting system are both required to be low. The frequency of this booming is quite high, being about 100 Hz or so. An additional characteristic of the booming vibration of the engine-transmission assembly and the vehicle body is that the amplitude of vibration is much smaller than those of the other above mentioned types of vibration of the engine-transmission assembly, being in the neighborhood of 15 microns or so in half wave amplitude.

A transfer case is a part of a four wheel drive system found in four wheel drive and all wheel drive vehicles. The transfer case is connected to the transmission and also to the front and rear axles by means of driveshafts. It is also referred to as a "transfer gearcase", "transfer gearbox" or just "transfer box". A transfer case is unique to 4 wheel drive vehicles, and is what directs power to both ends and axles of the vehicle through two separate driveshafts. Two wheel drives don't need a transfer case as the driveshaft comes directly out of the transmission to the drive wheels. A "typical" 4-wheel drive arrangement, which is a longitudinal drivetrain, means that the engine and transmission is in-line with the vehicle from the front to the rear. In other words, it's not a front wheel drive arrangement.

The transfer case is attached to the rear of the transmission and gets its input directly from the transmission. Power is directed from the engine through the transmission and then through the transfer case to either the rear wheels or both the front and rear wheels. This is accomplished inside the transfer case by either chains or gears, depending on the type of transfer case. In any case, a 4-wheel drive vehicle will have a selection of two gear ranges. This is called High range and Low range. This is one of the characteristics that distinguish "4-wheel drive" from "All-Wheel Drive."

As the transfer case accepts input from the transmission, and the Hi-Low range selector is in the "Hi" position, the transfer case uses the highest gear ratio. This ratio is usually near or exactly a 1:1 ratio, which is the same input and output speed of the transfer case, meaning that there is no speed reduction or torque multiplication. If the driver chooses the "2WD Mode" of the transfer case, power is transferred to only the rear wheels, leaving the front driveshaft without any driving duties.

The transfer case receives power from the transmission and sends it to both the front and rear axles. This can be done with a set of gears, but the majority of transfer cases manufactured today are chain driven. On some vehicles, such as four wheel drive trucks or vehicles intended for off-road use, this feature is controlled by the driver. The driver can put the transfer case into either "two wheel drive" or "four wheel drive" mode.

Transfer cases are also classified as either "independent" or "married". "Married" transfer cases are bolted directly to the transmission. Sometimes a "married" transfer case is an integral part of the transmission and the two components share the same housing. An "independent" transfer case is completely separate from the transmission; a short driveshaft travels from the transmission to the independent transfer case.

The term transfer mode describes the method the manufacturer of a vehicle has chosen for its owner to be able to select how the transfer case shifts into its various modes. Some systems use a "stick" or lever located next to the transmission shift lever on the floor. Somewhere in a vehicle, there is a diagram to show what position the lever should be in to select 2-Hi, 4-Hi and 4-Lo.

The inventor is aware of rubber or polyurethane type mounts. However, such mounts are subject to ripping or tearing, especially during hard use situations.

Therefore, there is a need for a means to mount the transmission/transfer case in a manner which is durable and will not be subject to damage, such as ripping or tearing during hard use of the vehicle such as might be encountered during off-roading situations.

There is a further need for a means to mount the transmission/transfer case in a manner which will allow the motor, transmission and transfer case move freely during extreme off-roading without damaging the mount.

SUMMARY OF THE INVENTION

These, and other, objects are achieved by a mounting unit which is mounted to the frame cross member of a vehicle. The mounting unit includes a bottom unit which is bolted to the frame cross member and a top unit which is bolted to the transmission/transfer case adapter. The top and bottom units are bolted to one another. The mounting unit allows the motor, transmission, and transfer case to move freely with respect to each other during hard use conditions, including extreme four-wheeling, without damaging the mounting unit.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURE

The invention can be better understood with reference to the following drawing and description. The components in the FIGURE are not necessarily to scale, emphasis instead being placed upon illustrating the principles of the invention. Moreover, in the FIGURE, like referenced numerals designate corresponding parts throughout the view.

FIG. 1 is a perspective view of a transmission/transfer case mount embodying the principles of the present invention.

DETAILED DESCRIPTION OF THE INVENTION

Referring to the FIGURE, it can be understood that the present invention is embodied in a mount 10 which couples a transmission case 20 to a frame cross member 30. Transmission case 20 and cross member 30 are known to those skilled in the art and thus are indicated only schematically and will not be further discussed.

Mount 10 includes a bottom unit 40 which is fastened to the frame cross member by bolts 42 and 44 having heads, such as head 46, coupled to the cross frame member and threaded bodies, such as threaded body 48, coupled to a planar bottom wall 50 of the bottom unit. A V-shaped top 60 includes two sections 60' and 60" connected together at an apex 61. Top 60 is unitary with the bottom wall and with pentagonal sides, such as side 62. Each side has a fastener-accommodating element 64 mounted thereon near apex 66 of the side. Elements 64 include a washer 70 mounted on the side and surrounding a fastener-accommodating hole 72 defined through the side. Bottom unit 40 is formed of durable material, such as steel or the like.

Mount 10 further includes a top unit 80 which is fastened to the transmission case. Top unit 80 is U-shaped and is one-piece and includes two pentagonal sides, such as side 82, which are connected together by a planar bight section 84 having two fastener-accommodating holes 86 and 88, defined therethrough to accommodate fastener, such as bolts (not shown) to fixedly attach top unit 80 to the transmission case. Each of the sides of the top unit has an apex, such as apex 89 that is spaced apart from the bight section.

Each side of the top unit includes a fastener-accommodating hole, such as hole 90, defined therethrough in position to be aligned with a corresponding fastener-accommodating hole 72 in the bottom unit. A fastener, such as a bolt (not shown) is accommodated in the aligned holes 90 and 72 to pivotally attach the top unit to the bottom unit whereby the transmission case is pivotally, yet securely, mounted to the frame cross member.

The top and bottom units are steel so they will be durable, with the pivotal connection described above permitting movement of the steel units relative to each other without the need of materials such as rubber or polyurethane. The apex sections 66 and 89 are located so the connection between the top and bottom units is adjacent to apex 61 so that the top unit can pivot with respect to the bottom unit in use.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A mounting unit comprising:
    A) a transmission case of an automobile;
    B) a frame cross member for the automobile; and
    C) a mount unit coupling the transmission case to the frame cross member and which includes
        (1) a top unit having a U-shaped body which includes two side elements connected to a planar bight section, the bight section having a fastener-accommodating hole defined therethrough through which a fastener extends to couple the bight section of the top unit to the transmission case, and a fastener-accommodating hole defined in each side element, and
        (2) a bottom unit having
            (a) a bottom wall,
            (b) a threaded fastener threadably attached to the bottom wall and to the frame cross member to threadably attach the bottom unit to the frame cross member,
            (c) two pentagonal shaped sides each of which includes an apex that is located to be spaced apart from the bottom wall of the bottom unit,
            (d) a fastener-accommodating unit on each pentagonal side, each fastener-accommodating unit on each pentagonal side including a fastener-accommodating holed defined therethrough and located adjacent to the apex of the side and a washer mounted on the side in surrounding relation to the fastener-accommodating hole defined through the pentagonal side,
            (e) the fastener-accommodating unit on each pentagonal side being located to have the fastener-accommodating hole thereof aligned with a corresponding fastener-accommodating hole of a side element of the top unit whereby a fastener extending through the aligned holes couples the top unit to the bottom unit, and
            (f) a V-shaped top element on the pentagonal sides of the bottom unit.

2. The mounting unit defined in claim 1 further including a second threaded fastener attached to the bottom wall of the bottom unit and to the frame cross member.

3. The mounting unit defined in claim 2 wherein the side elements of the top unit are pentagonal in shape, with each side having an apex that is spaced apart from the bight section.

* * * * *